US008929336B2

(12) United States Patent
Rydnell et al.

(10) Patent No.: US 8,929,336 B2
(45) Date of Patent: Jan. 6, 2015

(54) METHOD AND DEVICE FOR HANDLING HANDOVER OF A COMMUNICATIONS SERVICE

(75) Inventors: Gunnar Rydnell, Vastra Frolunda (SE); Ann-Christine Sander, Vastra Frolunda (SE); Yong Yang, Molndal (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 62 days.

(21) Appl. No.: 13/537,973

(22) Filed: Jun. 29, 2012

(65) Prior Publication Data
US 2013/0010752 A1    Jan. 10, 2013

Related U.S. Application Data

(63) Continuation of application No. PCT/EP2012/062427, filed on Jun. 27, 2012.

(60) Provisional application No. 61/504,337, filed on Jul. 5, 2011.

(51) Int. Cl.
*H04W 36/14* (2009.01)
*H04W 36/00* (2009.01)
*H04W 76/02* (2009.01)

(52) U.S. Cl.
CPC ........ *H04W 36/0011* (2013.01); *H04W 76/026* (2013.01)
USPC .......................................................... 370/331

(58) Field of Classification Search
CPC ..... H04W 84/18; H04W 84/12; H04W 80/04; H04W 36/18; H04W 36/0011; H04W 36/14; H04W 36/08
USPC .................................. 370/331, 329, 315, 310
See application file for complete search history.

(56) References Cited

U.S. PATENT DOCUMENTS

2012/0189016 A1* 7/2012 Bakker et al. ................. 370/401
2012/0224564 A1* 9/2012 Paisal et al. ................... 370/331
2013/0142168 A1* 6/2013 Vedrine et al. ................ 370/331

OTHER PUBLICATIONS

3GPP, "3rd Generation Partnership Project; Technical Specification Group Services and System Aspects; General Packet Radio Service (GPRS) Enhancements for Evolved Universal Terrestrial Radio Access Network (E-UTRAN) Access (Release 10)", 3GPP Draft; 23401-A40, 3rd Generation Partnership Project (3GPP), Mobile Competence Centre, 650, Route Des Lucioles, F-06921 Sophia-Antipolis Cedex; France, vol. SA WG2, Jun. 22, 2011, 283 pages, XP050547963.

(Continued)

*Primary Examiner* — Andrew Lai
*Assistant Examiner* — Zhiren Qin
(74) *Attorney, Agent, or Firm* — Rothwell, Figg, Ernst & Manbeck, P.C.

(57) ABSTRACT

The embodiments herein relate to method in a mobile management entity, referred to as MME, for enabling handover of a communication service between a circuit switched (CS) network and a packet switched (PS) network. The user equipment is located in the CS network and having a communications service in the CS network. Handling is improved by providing communication between the MME and a mobile switching centre server.

20 Claims, 8 Drawing Sheets

(56) References Cited

OTHER PUBLICATIONS

"3rd Generation Partnership Project; Technical Specification Group Services and System Aspects; Feasibility Study of Single Radio Voice Call Continuity (SRVCC) from UTRAN/GERAN to E-UTrAN/HSPA; Stage 2 (Release 10)", 3GPP Standard; 3GPP TR 23.885, 3rd Generation Partnership Project (3GPP), Mobile Competence Centre; 650, Route Des Lucioles; F-06921 Sophia-Antipolis Cedex; France, vol. SA WG2, No. V1.3.0, Jun. 16, 2011, pp. 1-80, XP050553147.

International Search Report and Written Opinion dated Nov. 23, 2012, from corresponding International application No. PCT/EP2012/062427, 13 pages.

* cited by examiner

Mobility from Non-DTM to LTE/HSPA

METHOD AND DEVICE FOR HANDLING HANDOVER OF A COMMUNICATIONS SERVICE

This application claims the benefit of U.S. provisional patent application No. 61/504,337, filed Jul. 5, 2011, which is incorporated by reference herein in its entirety; this application is also a continuation of international patent application no. PCT/EP2012/062427, filed on Jun. 27, 2012, which is also incorporated by reference herein in its entirety.

TECHNICAL FIELD

Embodiments herein relate generally to a Mobile Management Entity (MME) and a method in the MME. More particularly the embodiments herein relate to enabling handover of a communication service between a Circuit Switched (CS) network and a packet switched (PS) network.

BACKGROUND

In a typical cellular network, also referred to as a wireless communication system, User Equipments (UEs), communicate via a Radio Access Network (RAN) to one or more Core Networks (CNs).

A user equipment is a mobile terminal by which a subscriber may access services offered by an operator's core network and services outside operator's network to which the operator's RAN and CN provide access. The user equipments may be for example communication devices such as mobile telephones, cellular telephones, or laptops with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular network. The communication may be performed e.g. between two user equipments, between a user equipment and a regular telephone and/or between the user equipment and a server via the radio access network and possibly one or more core networks, comprised within the cellular network.

The cellular network covers a geographical area which is divided into cell areas. Each cell area is served by a base station, e.g. a Radio Base Station (RBS), which sometimes may be referred to as e.g. evolved Node B (eNB), "eNodeB", "NodeB", "B node", or BTS (Base Transceiver Station), depending on the technology and terminology used. The base stations communicate over the air interface operating on radio frequencies with the user equipments within range of the base stations.

In a typical cellular system, also referred to as a wireless communications network, wireless terminals, also known as mobile stations and/or User Equipment units communicate via Radio Access Networks (RAN) to a core network The wireless terminals may be mobile stations or user equipments such as mobile telephones also known as cellular telephones, and laptops with wireless capability, e.g., mobile termination, and thus may be, for example, portable, pocket, hand-held, computer-included, or car-mounted mobile devices which communicate voice and/or data with radio access network.

The radio access network covers a geographical area which is divided into cell areas, with each cell area being served by a base station, e.g. a Radio Base Station (RBS), which in some radio access networks is also called eNodeB (eNB), NodeB, B node or base station. A cell is a geographical area where radio coverage is provided by the radio base station at a base station site. Each cell is identified by an identity within the local radio area, which is broadcast in the cell. The base stations communicate over the air interface operating on radio frequencies with the user equipments within range of the base stations.

The cellular network may apply to one or more radio access technologies such as for example Long Term Evolution (LTE), LTE Advanced, Wideband Code Division Multiple Access (WCDMA), Global System for Mobile Communications (GSM), or any other Third Generation Partnership Project (3GPP) radio access technology.

In for example, LTE, users expect a new network to support all the services from a legacy network. To meet these needs, Inter-technology mobility is an important feature. In LTE, voice service over LTE is Internet Protocol Multimedia Subsystem (IMS)-based Voice Over Internet Protocol (VoIP). LTE is a packet data network and VoIP is used for supporting voice on packet networks.

Inter-technology mobility is also important for introduction of new services. Inter-technology mobility, enables that a new service may be rolled out network-wide even though the wireless broadband access technology that best and most efficiently supports it has only been deployed in the highest traffic areas. Inter-technology mobility provides a bridge between the old and new access networks enabling seamless service continuity for the user over a wide area.

Inter-technology mobility may simplify rollout of a new LTE where voice services is moved to VoIP over IMS in conjunction with the deployment of an LTE access network by using inter-technology mobility together with a functionality called Single Radio Voice Call Continuity (SRVCC). SRVCC is an LTE functionality that allows a VoIP/IMS call in the LTE packet domain to be moved to a legacy circuit domain, e.g. GSM/UMTS or CDMA.

When a user equipment with an ongoing IMS voice call in LTE looses its LTE coverage, provided the 2G/3G, i.e. Circuit Switched (CS) network, does not support VoIP, the user does SRVCC to 2G/3G and continues the voice call in the CS network through a Mobile Switching Centre Server (MSC). The MSC is a 3G core network element which controls the network switching subsystem elements. When the user equipment gets back into LTE coverage, the operator may want for different reasons to move the user equipment back to LTE. That procedure is called return SRVCC (rSRVCC). Another use case for rSRVCC may also be that the user equipment was camping in 2G/3G and started a CS voice call in 2G/3G through the MSC. After some time the user equipment gets into LTE coverage, upon which the rSRVCC is triggered.

A handover of an ongoing voice call from LTE to a 3G or 2G network, or a handover of an ongoing voice call from 2G/3g to LTE is done by using a mechanism called a dedicated bearer. In general, a bearer is a logical channel that carries some information. A bearer may also be referred to as a radio resource. One EPS bearer is established when the user equipment 101 connects to the Packet Data Network (PDN) and remains throughout the lifetime of the connection. It is called as default bearer. Default bearer provides always on IP connectivity to the network. Any additional EPS bearer is called a dedicated bearer. Dedicated bearers contexts are established when a service in the network requests a prioritising of IP packets belonging to a specific media stream between two IP addresses and TCP/UDP ports. A dedicated bearer is a bearer that carries traffic for IP flows that have been identified as requiring a specific packet forwarding treatment. A dedicated bearer is request by a user equipment to transmit data with a particular QoS.

The current solutions require a lot of enhancements in Gn/Gp Serving General Packet Radio Services Support Node (SGSN) as well as S4 SGSN functionality to be able to provide rSRVCC. In addition, an optional Gs interface between the SGSN and the MSC server is needed, or a new interface between the MSC server and the SGSN must be defined. This involves both increased complexity of the communications network in addition to increased signaling.

SUMMARY

An objective of embodiments herein is therefore to obviate at least one of the above disadvantages and to provide improved handling of handover of a communications service.

According to a first aspect, the objective is achieved by a method in a mobile management entity, referred to as MME, for enabling handover of a communication service between a circuit switched, referred to as CS, network and a packet switched, referred to as PS, network. The user equipment is located in the CS network and has a communications service in the CS network. The MME receives a handover request message from a network node. The handover request message comprises a request for handover of the user equipment from the CS network to the PS network indicating that an allocation of a resource associated with the communications service in the PS network is needed. Based on the handover request message, the MME sends a resource allocation request message to a base station. The resource allocation request message comprises a request for the resource allocation in the PS network. The MME receives a resource allocation response message from the base station. The resource allocation response message is a response to the resource allocation request message. The resource allocation response message comprises information about the allocation of the resources in the PS network. The MME sends a handover response message to the network node. The handover response message is a response to the handover request message. The handover response message comprises information about the allocation of the resources in the PS network. The MME receives a handover notification message from the base station. The handover notification message comprises a notification that the handover from the CS network to the PS network is setup in the user equipment. The MME receives a create dedicated bearer request message from a Serving Gateway, SGW. The create dedicated bearer request message comprises a request to create a dedicated bearer associated with the communication service in the PS network. The MME sends an activate dedicated bearer request message to the user equipment. The activate dedicated bearer request message comprises a request to activate a dedicated bearer associated with the communications service. The MME receives a activate dedicated bearer response message from the user equipment. The activate dedicated bearer response message is a response to the activate dedicated bearer request message. The activate dedicated bearer response message comprises information about the activated dedicated bearer associated with the communications service. The MME ends an create dedicated bearer response message to the SGW. The create dedicated bearer response message is a response to the create dedicated bearer request message and which create dedicated bearer response message comprises information about the created dedicated bearer associated with the communications service, enabling handover of the communications service between the CS network and the PS network.

According to a second aspect, the objective is achieved by a mobile management entity, referred to as MME, for enabling handover of a communication service between a circuit switched, referred to as CS, network and a packet switched, referred to as PS, network. A user equipment is located in the CS network and has a communications service in the CS network. The MME comprises a receiving unit configured to receive a handover request message from a network node. The handover request message comprises a request for handover of the user equipment from the CS network to the PS network indicating that an allocation of a resource associated with the communications service in the PS network is needed. The MME comprises a sending unit configured to, based on the handover request message, send a resource allocation request message to a base station. The resource allocation request message comprises a request for the resource allocation in the PS network. The receiving unit is further configured to receive a resource allocation response message from the base station. The resource allocation response message is a response to the resource allocation request message. The resource allocation response message comprises information about the allocation of the resources in the PS network. The sending unit is further configured to send a handover response message to the network node. The handover response message is a response to the handover request message. The handover response message comprises information about the allocation of the resources in the PS network. The receiving unit is further configured to receive a handover notification message from the base station. The handover notification message comprises a notification that the handover from the CS network to the PS network 100b is setup in the user equipment. The receiving unit is further configured to receive a create dedicated bearer request message from the SGW. The create dedicated bearer request message comprises a request to create a dedicated bearer associated with the communication service in the PS network. The sending unit is further configured to send an active dedicated bearer request message to the user equipment. The active dedicated bearer request message comprises a request to activate a dedicated bearer associated with the communications service. The receiving unit is further configured to receive an active dedicated bearer response message from the user equipment. The active dedicated bearer response message is a response to the active dedicated bearer request message. The active dedicated bearer response message comprises information about the activated dedicated bearer associated with the communications service. The sending unit is further configured to send a create dedicated bearer response message to the SGW. The create dedicated bearer response message is a response to the create dedicated bearer request message and which create dedicated bearer response message comprises information about the created dedicated bearer associated with the communications service, enabling handover of the communications service between the CS network and the PS network.

Since the rSRVCC functionality is in a network node, such as the MME, handling of a communications service is improved.

Embodiments herein afford many advantages, of which a non-exhaustive list of examples follows:

By having the rSRVCC functionality in a network node such as e.g. the MME, the embodiments herein provide the advantage of avoiding an upgrade in SGSNs. This provides reduced complexity and signaling in the communications network.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein describes MME/MSC enhancement for Reverse SRVCC.

Figure 1:
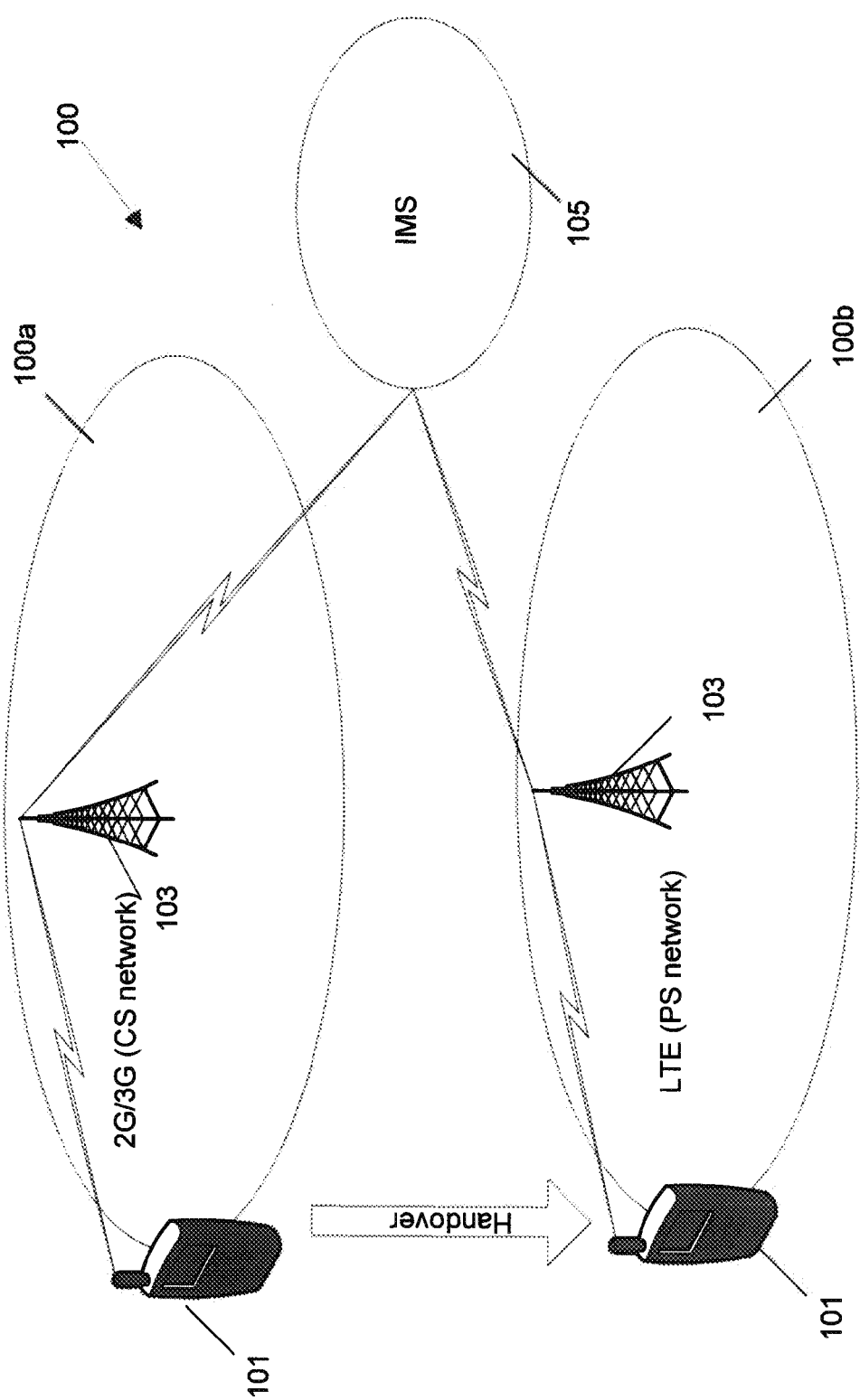
FIG. 1 is a schematic block diagram illustrating embodiments of a communications network.

FIG. 1 depicts a communications network 100 in which embodiments herein may be implemented. The communications network 100 may in some embodiments apply to one or more radio access technologies such as for example Long Term Evolution (LTE), LTE Advanced, Wideband Code Division Multiple Access (WCDMA), Global System for Mobile Communications (GSM), or any other Third Generation Partnership Project (3GPP) radio access technology.

The communications network 100 comprises a base station 103 serving a cell. The base station 103 may be a base station such as a NodeB, an eNodeB or any other network unit capable to communicate over a radio carrier with a user equipment 101. The user equipment 101 is in this case capable of communicating with the first network node 110 over a radio carrier.

The user equipment 101 may be any suitable communication device or computational device with communication capabilities capable to communicate with a base station over a radio channel, for instance but not limited to mobile phone, smart phone, personal digital assistant (PDA), laptop, MP3 player or portable DVD player (or similar media content devices), digital camera, or even stationary devices such as a PC. A PC may also be connected via a mobile station as the end station of the broadcasted/multicasted media. The user equipment 101 may also be an embedded communication device in e.g. electronic photo frames, cardiac surveillance equipment, intrusion or other surveillance equipment, weather data monitoring systems, vehicle, car or transport communication equipment, etc. The user equipment 101 is referred to as UE in some of the figures.

The user equipment 101 may be in an area with 2G/3G coverage, i.e. the user equipment 101 may be in a CS network 100a. The user equipment 101 has an ongoing IMS 105 communications service in the CS network 100a. IMS 105 is a framework for delivering IP multimedia services. At some point, the user equipment 101 moves from the CS network 100a to an area with LTE coverage, i.e. to a PS network 100b. This may be called a handover. For some reason, an operator also wants the communications service to be moved from the CS network 100a to the PS network 100b. A CS network 100a is a technology by which e.g. two network nodes establish a dedicated communications channel, i.e. circuit, before the nodes may communicate. The circuit functions as if the nodes were physically connected as with an electrical circuit. In a PS network 100b data is moved in separate, small blocks, i.e. packets, based on the destination address in each packet. When received, packets are reassembled in the proper sequence to make up the message. The bit delay in a CS-network 100a is constant during a connection, as opposed to a PS network 100b, where packet queues may cause varying packet transfer delay.

Figure 2:
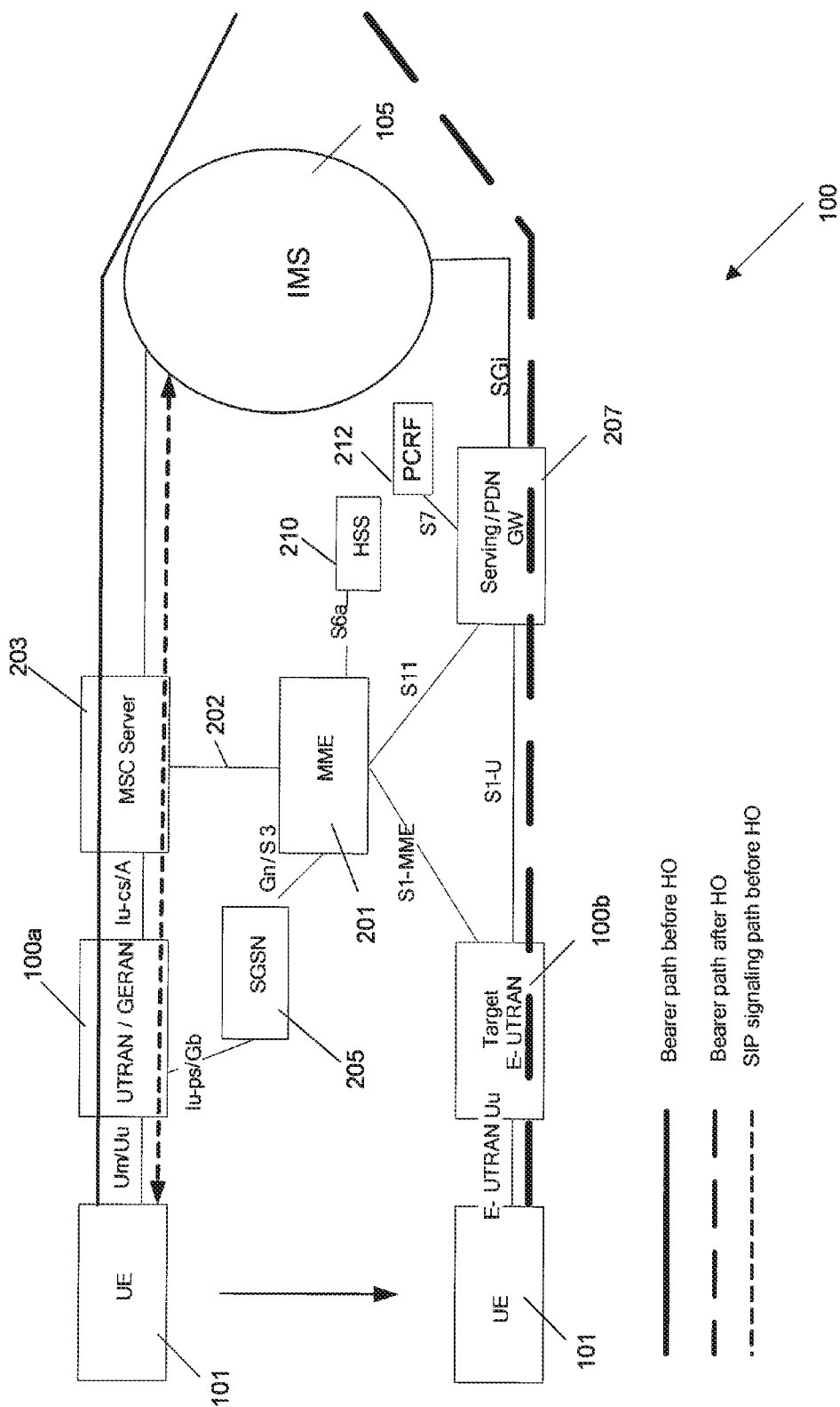
FIG. 2 is a schematic block diagram illustrating embodiments of a communications network.

FIG. 2 illustrates the communications network 100 in more detail. The user equipment 101 is handover from the CS network 100a, also referred to as UTRAN/GERAN, to the PS network 100b, and also referred to as target E-UTRAN. The CS network 100a is connected, via an Iu-cs/A interface, to a MSC Server 203, and further to the IMS 105. As mentioned above, the MSC Server 203 controls the network switching subsystem elements. The CS network 100a is connected to, via an Iu-ps/GB interface, a Serving General Packet Radio Services Support Node (SGSN) 205 which is a node responsible for the delivery of data packets from and to the user equipment 101 within its geographical service area. The SGSN 205 is connected, via a Gn/S3 interface, to a MME 201, which is the key control-node for the LTE access-network 100b. The MME 201 is connected, via an S6a interface, to a Home Subscriber Server (HSS) 210. The HSS 210 is a master user database that supports the IMS network entities that actually handle calls, and it comprises subscription-related information, performs authentication and authorization of the user equipment, and may provide information about the subscriber's location and IP information. The PS network 100b is also connected, via a S1-MME interface, to the MME 201. The PS network 100b is connected, via a S1-U interface, to a Serving Packet Data Network (PDN) GateWay (GW) PGW 207. The PGW 207 is connected, via a S11 interface, to the MME 201. The PGW 207 is further connected, via a S7 interface, to a Policy and Charging Rules Function (PCRF) 212. The PCRF 212 is responsible for determining policy rules in a multimedia network. The PGW 207 is connected, via a SGi interface, to the IMS 105. The continuous line in FIG. 2 illustrates a bearer path before the handover from the CS network 100a to the PS network 100b. The broken line illustrates a bearer path after the handover, and the dotted line illustrates a Session Initiation Protocol (SIP) signaling path before handover. SIP is a signaling protocol used for controlling multimedia communication sessions such as voice and video calls over IP.

The embodiments herein make use of an existing Sv interface, to allow the MSC-server 203 to directly contact the MME/S4-SGSN 205, in case of HSPA, which is selected by a DNS procedure by using TAI/RAI FQDN, the MME/S4-SGSN 205 then pre-allocate the network resource in the target RAN 100b and, after UE handover to LTE/HSPA 100b, the voice/video bearer contexts will be established either triggered by network or triggered by the user equipment 101

In some embodiments, P-TMSI and RAI are sent to the MSC server 203 by RAN during CS call setup. The user equipment 101 may report a rSRVCC IE, which may be used to locate the source SGSN/old MME, to RNC/BSC when it is involved in the CS call establishment, comprising CS MO/MT, CS handover, and SRVCC. The RNC/BSC comprises the rSRVCC Info IE in Handover/Relocation Required message for CS to PS handover, e.g. by comprising the rSRVCC Info IE into GERAN Classmark When the MME 201 receives the Sv message rSRVCC CS to PS handover request together with P-TMSI, and RAI, depending on whether user equipment 101 is having CS call from a Dual Transfer Mode (DTM) supported access or from a non-DTM supported access, the following applies:

DTM is a protocol based on the GSM standard that allows simultaneous transfer of CS voice and PS data over the same radio channel.

From DTM supported access, such as from UTRAN: In this case, the MME 201 will expect to receive a Forward Relocation Request message from the 2G/3G SGSN 205, Gn/Gp SGSN or S4-SGSN. The Forward Relocation Request message is triggered due to receiving a Handover Required message from a RNC/BSC with DTM support at the same time frame. Therefore the MME 201 has got all the information that needs to be comprised in a Handover Request sent to the eNB 103 to setup the corresponding bearer context comprising Voice/Video Bearers information. After the eNB 103 has allocated the needed resource and sent a positive response in a Handover Request Acknowledge message, the MME 201 answers to the old SGSN 205 with a Forward Relocation Response message and answers to the MSC 203 with a rSRVCC CS to PS handover response, which lead to the SGSN 205 and the 203 MSC sending a handover command to the user equipment 1010.

When the user equipment 101 started in GERAN, i.e. suspended in a S4-SGSN or Gn/Gp SGSN, from a non-DTM supported access such as from GERAN: in this case, after MME 201 receives an rSRVCC CS to PS handover request with P-TMSI and RAI. The MME 201 may send a Context Request to the old SGSN 205 to request a UE context. The old SGSN 205 responds with a Context Response. Therefore, the MME 201 has got all the information that is needed to be comprised in a Handover Request sent to the eNB 103 to setup the corresponding bearer contexts comprising both voice/video bearer context and other PS bearer contexts. After the eNB 103 has allocated the needed resource and sent a positive response in a Handover Request Acknowledge message, the MME 201 answers to the MSC 203 with an rSRVCC CS to PS handover response. This leads to the MSC 203 sending a handover command to the user equipment 101.

When the user equipment 101 started in the E-UTRAN, i.e. suspended in the MME 201, the user equipment 101 has performed a normal SRVCC handover to non-DTM mode radio access, from non-DTM supported access such as from GERAN: In this case, after the MME 201 receives a rSRVCC CS to PS handover request with P-TMSI and RAI, the MME 201 already has the UE Context and therefore the MME 201 has all the information that is needed to be comprised in the Handover Request sent to the eNB 103 to setup the corresponding bearer contexts comprising both voice/video bearer context and other PS bearer contexts. After the eNB 103 allocates the needed resource and has sent a positive response in a Handover Request Acknowledge message, the MME 201 answers to the MSC 203 with an rSRVCC CS to PS handover response, which lead to the MSC 203 sending a handover command to the user equipment 101.

The procedure described above is also applicable for S4-SGSN, when the user equipment 101 performs an rSRVCC back to HSPA. In this case, the S4-SGSN is used instead of the MME 201.

The method for handling handover of the communications service from Non-DTM to LTE/HSPA according to some embodiments will now be described with reference to the combined signalling diagram and flowchart depicted in FIG. 3. When user equipment 101 had a CS call in a non-DTM radio access network, the PS service is suspended in the SGSN 205. There are two sub cases:

User equipment 101 established IMS voice call first in the MME 201. Therefore the MME 201 has all the rest of the PS bearer contexts except for the Voice bearer context which has been deleted before the user equipment 101 performs a normal SRVCC move to the 2G/3G 100a.

The user equipment 101 establishes a CS call in 2G/3G 100a. The PS bearer contexts which were established beforehand are kept in the SGSN 205 and are suspended.

The following description uses an IMS voice call as example. However, any other type of communications service or multimedia service, such as e.g. video call, is also applicable.

The method comprises the following steps, which steps may as well be carried out in another suitable order than described below.

Step 301

The BSC/RNC 301 sends a handover required to the MSC Server 203, this message comprises the target Tracking Area Code. The handover required message comprises an indication this HO is for SRVCC. If the MSC Server 203 is the target MSC, it forwards the handover required to the anchor MSC Server.

Step 302

The MSC 203 sends an rSRVCC CS to PS handover request comprising P-TMSI and RAI if they are available to the target MME 201. That is, the user equipment 101 is suspended in the SGSN 205 and previous attached in the SGSN 205, indicating a Voice Bearer is needed to be handover to LTE 100b.

Step 303

In case b above, if the MME 201 has no UE context, the MME 201 sends a Context Request using P-TMSI and RAI to find the old SGSN 205.

Step 304

In case b above, the SGSN 205 responds with a Context Response message comprising all UE contexts.

Step 305

The MME 201 sends a Handover Request towards the eNB 103 and allocates resources in E-UTRAN.

The handover request comprises the voice/video bearer(s) requested by the MSC server 203 and the rest of the PS bearer context. The requested voice/video bearer(s) might be using static configured characteristics for Voice/Video, since the characteristics of voice/video bearer context should be well known in one operator network. The MME 201 may use an initial UE context setup procedure.

Step 306

The eNB 103 allocates the resource and provides the needed resource in the Handover Request Acknowledge message.

Step 307

The MME 201 sends an rSRVCC CS to PS handover response message to the MSC 203. The handover response message comprises resources pre-allocated by the eNB 103 to facilitate the handover.

Step 308

The MSC 203 sends a "handover command" to the BSC 301. The handover command may be seen as a handover required acknowledgement. The handover command may be sent via the target MSC. The MSC Server 203 may comprise, the handover command, the IP address/ports and selected codec for the ATGW, for the MGW or for the remote end depending on the situation.

Step 309

The BSC 301 forwards the "handover command" to the user equipment 101, indicating CS to PS handover.

Step 310

The user equipment 101 sends a Handover confirmation to the eNB 103.

Step 311

The eNB 103 sends a Handover Notify to the MME 201.

Step 312

The MME 201 sends a Modify Bearer Request to the SGW 207 to update PS bearer contexts first. The SGW 207 forwards the Modify Bearer Request to the PGW 207.

This step to Modify Bearers is done at handover, and it basically is there to tell the SGW 207 the eNB address.

Step 313

The SGW 207 responds to the MME 201 with a Modify Bearer Response.

Step 314

The MME 201 sends a bearer resource command for voice/video in case the IMS PDN connection is in place if it is received Non Access Stratum (NAS) message BEARER RESOURCE ALLOCATION REQUEST.

NAS is a functional layer in the Wireless Telecom protocol stack between the Core Network and the User Equipment 101. The layer supports signaling and traffic between those two elements.

An rSRVCC capable user equipment 101 may have the IMS PDN connection established in 2G/3G. This step may anyway be triggered by user equipment 101 since the pre-allocated bearer contexts for voice/video may not be used since the associated TFT is not available. The pre-allocation just make sure the eNB 103 has reserved resource for the voice and video, thus user equipment may request bearer resources.

Step 315

The P-CSCF 305 sends a Voice/video service description, i.e. a request network resource, to the PCRF 212. This is triggered by a message from the MSC 203, which is not shown in FIG. 3.

Step 316

The PCRF 212 continues the halted voice bearer allocation. The PCRF 212 builds the corresponding PCC rule and sends it to the PGW 207.

Step 317

The PGW 207 sends a Create Bearer Request to create bearer contexts for voice/video to the SGW 207 and then forwarded to the MME 201.

Step 318

The MME 201 requests the user equipment 101 to setup Voice bearer by sending an ACTIVATE DEDICATED EPS BEARER CONTEXT REQUEST message. Note that the corresponding E-RABs may have been established from the eNB 103 previously in step 306 and step 509.

Step 319

The user equipment 101 accepts the bearer establishment by replying with ACTIVATE DEDICATED EPS BEARER CONTEXT ACCEPT message.

Step 320

The MME 201 sends a Create Bearer Response to the SGW/PGW 207.

Voice service is now handover to the PS 100b in LTE, and the VoIP call may be sent in the dedicated bearer. In case the MME 201 has a complete UE context, i.e. PS service is suspended in the MME 201, the steps 303 and 304 may be skipped.

The method for handling handover of the communications service from Non-DTM to LTE/HSPA according to some embodiments will now be described with reference to the combined signalling diagram and flowchart depicted in FIG. 5. When user equipment 101 had a CS call in a non-DTM radio access network, the PS service is suspended in the SGSN 205. There are two sub cases:

User equipment 101 established IMS voice call first in the MME 201. Therefore the MME 201 has all the rest of the PS bearer contexts except for the Voice bearer context which has been deleted before the user equipment 101 performs a normal SRVCC move to the 2G/3G 100a.

The user equipment 101 establishes a CS call in 2G/3G 100a. The PS bearer contexts which were established beforehand are kept in the SGSN 205 and are suspended.

The following description uses an IMS voice call as example. However, any other type of communications service or multimedia service, such as e.g. video call, is also applicable.

The method comprises the following steps, which steps may as well be carried out in another suitable order than described below.

Step 501

Figure 3:
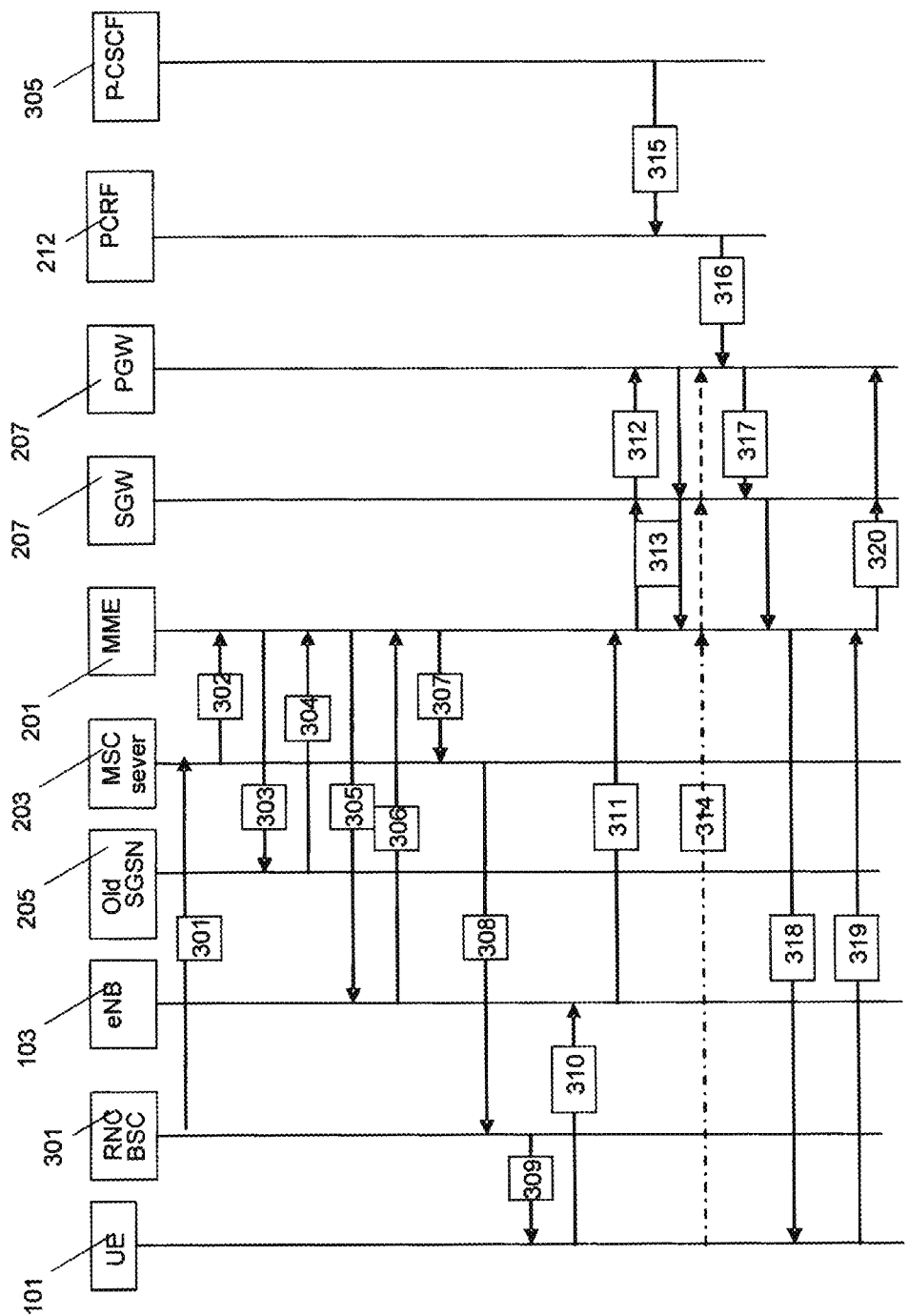
FIG. 3 is a combined flow chart and signaling diagram illustrating embodiment of a method for mobility from Non-DTM to LTE/HSPA.

This step corresponds to step 301 in FIG. 3,

The BSC/RNC 301 sends a handover required to the MSC Server 203, this message comprises the target Tracking Area Code. The handover required message comprises an indication this HO is for SRVCC. If the MSC Server 203 is the target MSC, it forwards the handover required to the anchor MSC Server.

Step 502

This step corresponds to step 302 in FIG. 3,

The MSC 203 sends an rSRVCC CS to PS handover request comprising P-TMSI and RAI if they are available to the target MME 201. That is, the user equipment 101 is suspended in the SGSN 205 and previous attached in the SGSN 205, indicating a Voice Bearer is needed to be handover to LTE 100b.

Step 503

In some embodiments, the MSC Server 203 sends an Access Transfer Notification to the ATCF 501, e.g. a SIP re-INVITE or INVITE message, which indicates to the ATCF 501 that it should prepare for the transfer of media to PS 100b.

Step 504

In some embodiments, the ATCF 501 retrieves the ports/codecs received from the user equipment 101 in its IMS registration. The MSC 203 is able to correlate the IMS registration made by the user equipment 101 and the one made by the MSC 203 on behalf of the user equipment 101, for instance based on the C-MSISDN or on the IMEI derived instance-id used by both those registrations. The ATCF 501 allocates media ports on the ATGW, forwards the Transfer Preparation Request to the P-CSCF 305 after comprising, in that message, the IP address/ports the user equipment 101 intends to use after the rSRVCC, as well as the IP address/ ports the ATGW is sending voice media to, i.e. the SDP for both the user equipment 101 and the ATGW may be comprised in the message.

Step 505

The P-CSCF 305 interacts with the PCRF 212 to establish a voice bearer for the session being transferred using the information received from the ATCF 501 in the Transfer Preparation Request message. The P-CSCF 212 indicates that this bearer establishment is due to rSRVCC.

The Transfer Preparation Request message may e.g., be implemented using an INVITE or other appropriate message. It is left for a later stage to decide on the appropriate message.

Step 506a

The PCRF 212 waits to initiate the bearer setup towards P-GW 207 since this bearer establishment is due to rSRVCC.

Step 507

This step corresponds to step 303 in FIG. 3.

In case b above, if the MME 201 has no UE context, the MME 201 sends a Context Request using P-TMSI and RAI to find the old SGSN 205.

Step 508

This step corresponds to step 304 in FIG. 3.

In case b above, the SGSN 205 responds with a Context Response message comprising all UE contexts.

Step 509

This step corresponds to step 305 and step 306 in FIG. 3.

Target MME 201 allocates resources in E-UTRAN.

Together with the requested Voice/video bearer, requested by the MSC server 203, which may use static configured characteristics for Voice/Video, since the characteristics of the voice/video bearer context and the rest of the PS bearer contexts should be well known in one operator network, the MME 201 sends a Handover Request towards the eNB 103. The MME 201 may use an initial UE context setup procedure.

The eNB 103 allocates the resource and provides the needed resource in the Handover Request Acknowledge message.

Step 510

This step corresponds to step 307 in FIG. 3.

The MME 201 sends an rSRVCC CS to PS handover response message to the MSC 203. The handover response message comprises resources pre-allocated by the eNB 103 to facilitate the handover.

Step 511

This step corresponds to step 308 and 309 in FIG. 3.

The MSC 203 sends a "handover command" to the BSC 301. The handover command may be seen as a handover required acknowledgement. The handover command may be sent via the target MSC. The MSC Server 203 may comprise, the handover command, the IP address/ports and selected codec for the ATGW, for the MGW or for the remote end depending on the situation.

The BSC 301 forwards the "handover command" to the user equipment 101, indicating CS to PS handover.

Step 512

In some embodiments, in case of ATCF 501 with media anchored in the ATGW, the MSC Server 203 sends an Access Transfer Preparation Request, e.g. a SIP re-INVITE or PRACK message, to the ATCF 501 to trigger the ATCF/ATGW to have the media path switched to the IP address/port of the user equipment 101 on the target access.

In case there is no media anchored in the ATGW, the MSC Server 203 sends an Access Transfer Preparation Request to the ATCF 501 and the media path between ATCF/ATGW and the MSC Server/MGW is to be established.

Step 513

This step corresponds to step 310 in FIG. 3.

The user equipment 101 sends a Handover confirmation to the eNB 103. In other words, handover to LTE is performed.

Step 514

This step corresponds to step 311 in FIG. 3.

The eNB 103 sends a Handover Notify to the MME 201. In other words, handover to LTE is performed.

Step 515

This step corresponds to step 312 in FIG. 3.

The MME 201 sends a Modify Bearer Request to the SGW 207 to update PS bearer contexts first. The SGW 207 forwards the Modify Bearer Request to the PGW 207.

The MME 201 tells the PGW 207 and SGW 207 that the user equipment 101 is now reachable via the eNB 103. The new dedicated bearer for voice is added in step 506b as described below.

Step 516

The VoIP call or any communications service may be sent to the user equipment 101 in LTE via the default bearer.

Step 517

The PDN GW 207 informs the PCRF 212 about the change of, for example, the RAT type.

Step 506b

This step corresponds to steps 316, 317, 318, 319 and 320 in FIG. 3.

In some embodiments, the PCRF 212 continues the halted voice bearer allocation. The PCRF 212 builds the corresponding PCC rule and sends it to the PGW 207.

The PGW 207 sends a Create Bearer Request to create bearer contexts for voice/video to the SGW 207 and then forwarded to the MME 201.

The MME 201 requests the user equipment 101 to setup Voice bearer by sending an ACTIVATE DEDICATED EPS BEARER CONTEXT REQUEST message. Note that the corresponding E-RABs may have been established from the eNB 103 previously in step 306 and step 509.

The user equipment 101 accepts the bearer establishment by replying with ACTIVATE DEDICATED EPS BEARER CONTEXT ACCEPT message.

The MME 201 sends a Create Bearer Response to the SGW/PGW 207.

The new dedicated bearer for voice is now added, and the communication service may go in the dedicated bearer.

Step 518

Voice service is now handover to the PS 100b in LTE, and the VoIP call may be sent in the dedicated bearer. In case the MME 201 has a complete UE context, i.e. PS service is suspended in the MME 201, the steps 303 and 304 may be skipped.

The method for handling handover of the communications service from DTM to LTE/HSPA according to some embodiments will now be described with reference to the combined signalling diagram and flowchart depicted in FIG. 4. When the user equipment 101 has established a CS call in a DTM supported radio access network, such as UTRAN, the user equipment 10 may have PS bearer contexts established and running payload transferring at the same time. Note that the PS bearer contexts may belong to an APN other than IMS APN. When the RNC detects that the LTE network 100n is more suitable for the user equipment 101, the RNC will send Relocation Required to both CS Domain 100a, i.e. MSC server 203 and PS Domain 100b, i.e. SGSN 205.

The following description uses an IMS voice call as example. However, any other type of communications service or multimedia service, such as e.g. video call, is also applicable.

The method comprises the following steps, which steps may as well be carried out in another suitable order than described below.

Step 401

Figure 5:
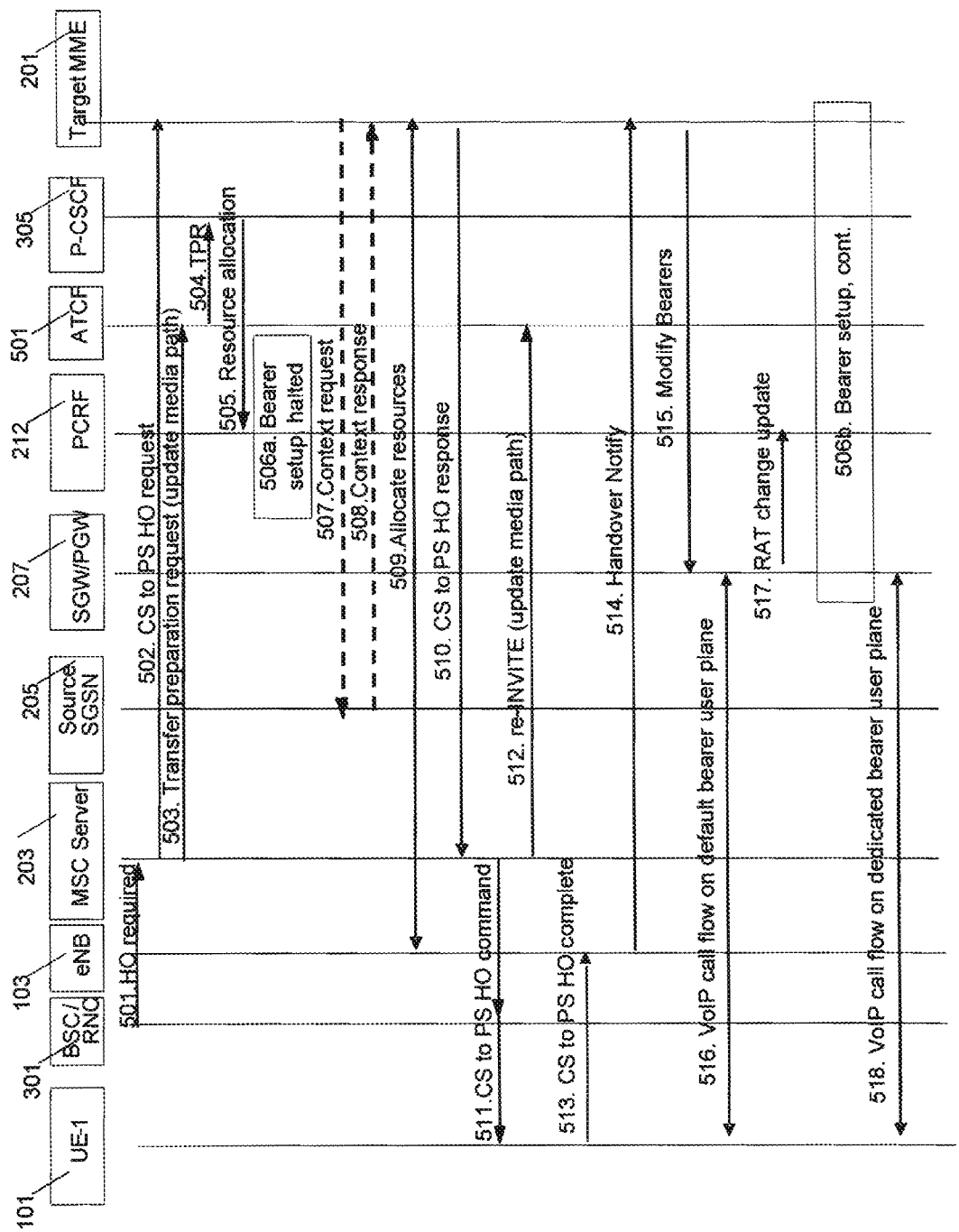
FIG. 5 is a combined flow chart and signalling diagram illustrating embodiments of a method for mobility from Non-DTM to LTE/HSPA.

These steps correspond to step 301 in FIG. 3 and step 501 in FIG. 5.

The BSC/RNC 301 sends a handover required to the MSC Server 203, this message comprises the target Tracking Area Code and a target ID where Target eNB id is comprised. The handover required message comprises an indication this HO is for SRVCC. If the MSC Server 203 is the target MSC, it forwards the handover required to the anchor MSC Server.

Step 402

In the DTM case where the user equipment 101 is active in the PS domain 100a, the BSC/RNC 301 sends a relocation required message, i.e. a handover required message, from the Source RNC to the target SGSN 205. This message comprises the target ID where Target eNB id is comprised.

Step 403

This step corresponds to step 302 in FIG. 3 and step 502 in FIG. 5.

The MSC 203 sends an rSRVCC CS to PS handover request comprising P-TMSI and RAI if they are available to the target MME 201. That is, the user equipment 101 is suspended in the SGSN 205 and previous attached in the SGSN 205, indicating a Voice Bearer is needed to be handover to LTE 100b.

Step 404

The SGSN 205 sends a Forward Relocation Request to the MME 201 to handover the PS bearer contexts.

Step 405

This step corresponds to step 305 in FIG. 3 and step 509 in FIG. 5.

The MME 201 sends a Handover Request towards the eNB 103 and allocates resources in E-UTRAN.

The handover request comprises the voice/video bearer(s) requested by the MSC server 203 and the rest of the PS bearer context. The requested voice/video bearer(s) might be using static configured characteristics for Voice/Video, since the characteristics of voice/video bearer context should be well known in one operator network. The MME 201 may use an initial UE context setup procedure.

Step 406

This step corresponds to step 306 in FIG. 3 and step 509 in FIG. 5.

The eNB 103 allocates the resources and provides the needed resources in the Handover Request Acknowledge message.

Step 407

This step corresponds to Step 307 in FIG. 3 and step 510 in FIG. 5.

The MME 201 sends an rSRVCC CS to PS handover response message to the MSC 203. The handover response message comprises resources pre-allocated by the eNB 103 to facilitate the handover.

Step 408

The MME 201 sends a Forward Relocation Response message to the SGSN 205 comprising pre-allocated resources for the rest of the PS bearer contexts by the eNB 103 to facilitate the handover.

Step 409

This step corresponds to step 308 in FIG. 3 and step 511 in FIG. 5.

The MSC 203 sends a "handover command" to the BSC 301. The handover command may be seen as a handover required acknowledgement. The handover command may be sent via the target MSC. The MSC Server 203 may comprise, the handover command, the IP address/ports and selected codec for the ATGW, for the MGW or for the remote end depending on the situation.

Step 410

The SGSN 205 sends a "handover command" to the RNC 301. The handover command may be seen as a handover required acknowledgement. The handover command may be sent via the target MSC. The MSC Server 203 may comprise, the handover command, the IP address/ports and selected codec for the ATGW, for the MGW or for the remote end depending on the situation.

Step 411

This step corresponds to step 309 in FIG. 3 and step 511 in FIG. 5.

The RNC 301 forwards the received "handover commend" to the user equipment 101, indicating CS to PS handover.

Step 412

This step corresponds to step 310 in FIG. 3 and step 513 in FIG. 5.

The user equipment 101 sends a Handover confirmation to the eNB 103.

Step 413

This step corresponds to step 311 in FIG. 3 and step 514 in FIG. 5.

The eNB 103 sends a Handover Notify to the MME 201.

Step 414

This step corresponds to step 312 in FIG. 3 and step 515 in FIG. 5.

The MME 201 sends a Modify Bearer Request to the SGW 207 to update PS bearer contexts first. The SGW 207 forwards the Modify Bearer Request to the PGW 207.

Step 415

This step corresponds to step 313 in FIG. 3.

The SGW 207 responds to the MME 201 with a Modify Bearer Response.

Step 416

In some embodiments, the user equipment 101 sends a PDN connectivity Request to establish IMS PDN connection if it is not established when it was in 3G. This step may not need since an rSRVCC capable UE shall have IMS PDN connection established in 2G/3G)

Step 417

In some embodiments, the MME 201 sends, to the PGW/SGW 207, a Create Session Request message to establish IMS PDN connection. The MME 201 receives a Create Session Response from the PGW/SGW 207. This step may not be need since an rSRVCC capable user equipment 101 may have the IMS PDN connection established in 2G/3G.

Step 418

This step corresponds to step 314 in FIG. 3.

The user equipment 101 may request additional voice/video bearer resource to be able to continue with the voice call by sending BEARER RESOURCE ALLOCATION REQUEST message. This step may anyway be triggered by user equipment 101 since the pre-allocated bearer contexts for voice/video may not be used since the associated TFT is not available. The pre-allocation just make sure the eNB 103 has reserved resource for the voice and video, thus user equipment may request bearer resources. The user equipment 101 may be an rSRVCC capable user equipment 101

Step 419

The MME 201 sends a Bearer Resource Command to the SGW 207, and the SGW 207 forwards it to the PGW 207. This step is associated with step 417. In some embodiments, step 419 is not needed since the PCRF 212/PGW 207 initiated dedicated bearer resource maybe come first to establish voice and/or video bearer context.

Step 420

The P-CSCF 305 sends a Voice service description to the PCRF 212 and requests network resources. This is triggered by a message from the MSC server 203, which is not shown in FIG. 4.

Step 421

This step corresponds to step 316 in FIG. 3.

The PCRF 212 builds the corresponding PCC rule and sends it to the PGW 207.

Step 422

This step corresponds to step 317 in FIG. 3.

The PGW 207 sends a Create Bearer Request to create bearer contexts for voice/video to the SGW 207 and then forwarded to the MME 201.

Step 423

This step corresponds to step 318 in FIG. 3.

The MME 201 requests the user equipment 101 to setup Voice bearer by sending an ACTIVATE DEDICATED EPS BEARER CONTEXT REQUEST message. Note that the corresponding E-RABs may have been established from the eNB 103 previously in step 406.

Step 424

This step corresponds to step 319 in FIG. 3.

The user equipment 101 accepts the bearer establishment by replying with ACTIVATE DEDICATED EPS BEARER CONTEXT ACCEPT message.

Step 425

This step corresponds to step 320 in FIG. 3.

The MME 201 sends a Create Bearer Response to the SGW/PGW 207.

Voice service is now handover to the PS 100*b* in LTE, and the VoIP call may be sent in the dedicated bearer.

The method for handling handover of the communications service from DTM to LTE/HSPA according to some embodiments will now be described with reference to the combined signalling diagram and flowchart depicted in FIG. 6. When the user equipment 101 has established a CS call in a DTM supported radio access network, such as UTRAN, the user equipment 10 may have PS bearer contexts established and running payload transferring at the same time. Note that the PS bearer contexts may belong to an APN other than IMS APN. When the RNC detects that the LTE network 100*n* is more suitable for the user equipment 101, the RNC will send Relocation Required to both CS Domain 100*a*, i.e. MSC server 203 and PS Domain 100*b*, i.e. SGSN 205.

The following description uses an IMS voice call as example. However, any other type of communications service or multimedia service, such as e.g. video call, is also applicable.

The method comprises the following steps, which steps may as well be carried out in another suitable order than described below.

Step 601

Figure 4:
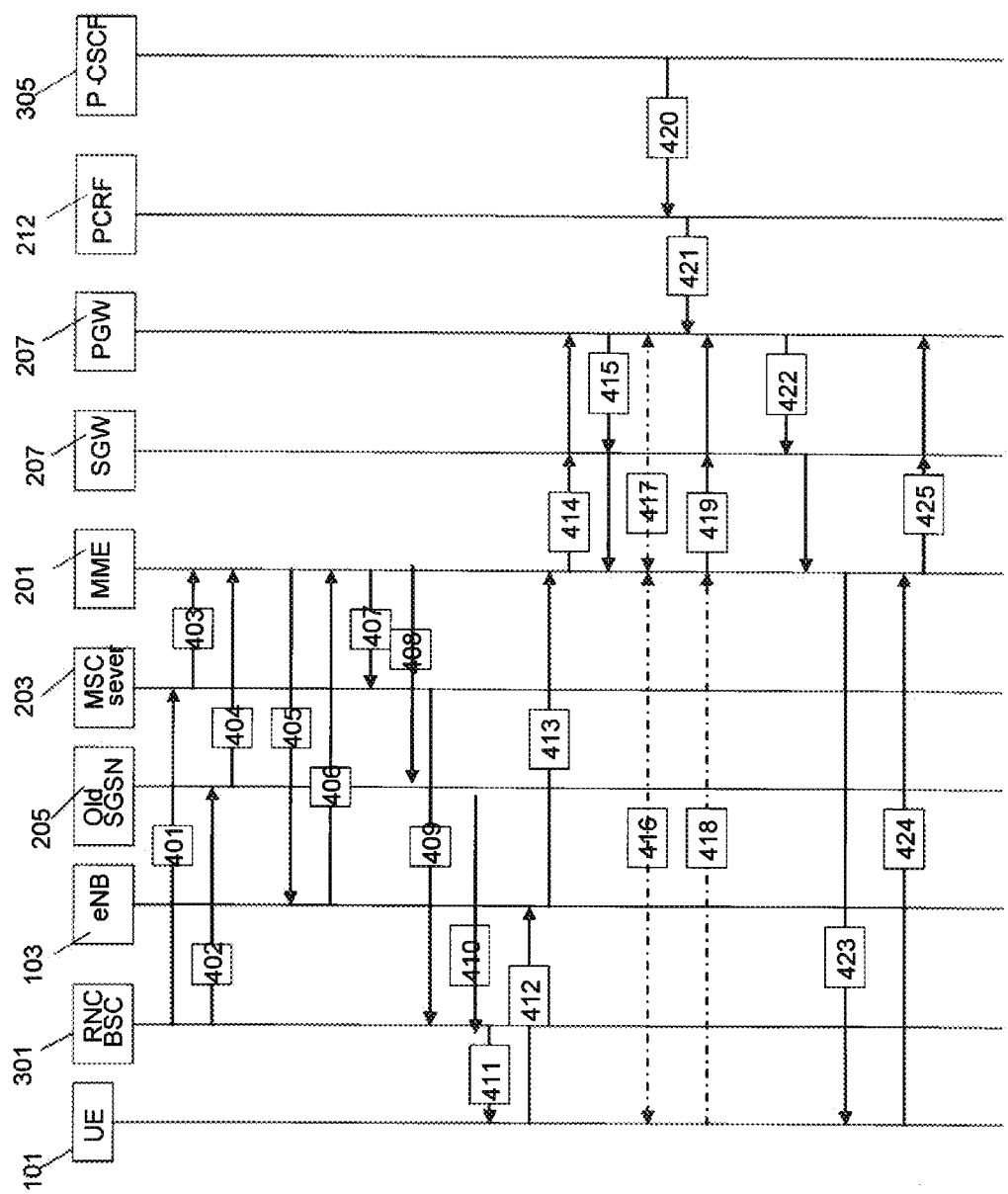
FIG. 4 is a combined flow chart and signalling diagram illustrating embodiments of a method for mobility from DTM to LTE/HSPA.

These steps correspond to step 301 in FIG. 3, step 401 in FIG. 4 and step 501 in FIG. 5.

The BSC/RNC 301 sends a handover required to the MSC Server 203, this message comprises the target Tracking Area Code and a target ID where Target eNB id is comprised. The handover required message comprises an indication this HO is for SRVCC. If the MSC Server 203 is the target MSC, it forwards the handover required to the anchor MSC Server.

Step 602

This step corresponds to step 302 in FIG. 3, step 403 in FIG. 4 and step 502 in FIG. 5.

The MSC 203 sends an rSRVCC CS to PS handover request comprising P-TMSI and RAI if they are available to the target MME 201. That is, the user equipment 101 is suspended in the SGSN 205 and previous attached in the SGSN 205, indicating a Voice Bearer is needed to be handover to LTE 100*b*.

Step 603

This step corresponds to step 503 in FIG. 5.

In some embodiments, the MSC Server 203 sends an Access Transfer Notification to the ATCF 501, e.g. a SIP re-INVITE or INVITE message, which indicates to the ATCF 501 that it should prepare for the transfer of media to PS 100*b*.

Step 604

This step corresponds to step 504 in FIG. 5.

In some embodiments, the ATCF 501 retrieves the ports/codecs received from the user equipment 101 in its IMS registration. The MSC 203 is able to correlate the IMS registration made by the user equipment 101 and the one made by the MSC 203 on behalf of the user equipment 101, for instance based on the C-MSISDN or on the IMEI derived instance-id used by both those registrations. The ATCF 501 allocates media ports on the ATGW, forwards the Transfer Preparation Request to the P-CSCF 305 after comprising, in that message, the IP address/ports the user equipment 101 intends to use after the rSRVCC, as well as the IP address/ports the ATGW is sending voice media to, i.e. the SDP for both the user equipment 101 and the ATGW may be comprised in the message.

Step 605

This step corresponds to step 505 in FIG. 5.

The P-CSCF 305 interacts with the PCRF 212 to establish a voice bearer for the session being transferred using the information received from the ATCF 501 in the Transfer Preparation Request message. The P-CSCF 212 indicates that this bearer establishment is due to rSRVCC.

The Transfer Preparation Request message may e.g., be implemented using an INVITE or other appropriate message. It is left for a later stage to decide on the appropriate message.

Step 601*a*

In the DTM case the user equipment 101 is active in the PS domain 100*a*, and the BSC/RNC 30 sends a Relocation Required message to the source SGSN 205.

Step 606*a*

This step corresponds to step 506*a* in FIG. 5.

The PCRF 212 waits to initiate the bearer setup towards P-GW 207 since this bearer establishment is due to rSRVCC.

Step 607

The source SGSN 205 sends a Relocation Request message to the target MME 201.

Step 608

This step corresponds to step 305 and step 306 in FIG. 3 and step 509 in FIG. 5.

Target MME 201 allocates resources in E-UTRAN.

Together with the requested Voice/video bearer, requested by the MSC server 203, which may use static configured characteristics for Voice/Video, since the characteristics of the voice/video bearer context and the rest of the PS bearer contexts should be well known in one operator network, the MME 201 sends a Handover Request towards the eNB 103. The MME 201 may use an initial UE context setup procedure.

The eNB 103 allocates the resource and provides the needed resource in the Handover Request Acknowledge message.

Step 609

The target MME 201 sends a relocation response to the Source SGSN 205 in response to the request sent in step 607.

Step 609*b*

The source SGSN 205 sends a HO Required Ack to the RAN, i.e. to the BSC/RNC 301.

Step 610

This step corresponds to step 307 in FIG. 3 and step 510 in FIG. 5.

The MME 201 sends an rSRVCC CS to PS handover response message to the MSC 203. The handover response message comprises resources pre-allocated by the eNB 103 to facilitate the handover.

Step 611

This step corresponds to steps 308 and 309 in FIG. 3 and step 511 in FIG. 5.

The MSC 203 sends a "handover command" to the BSC 301. The handover command may be seen as a handover required acknowledgement. The handover command may be sent via the target MSC. The MSC Server 203 may comprise, the handover command, the IP address/ports and selected codec for the ATGW, for the MGW or for the remote end depending on the situation.

The BSC 301 forwards the "handover command" to the user equipment 101, indicating CS to PS handover.

Step 612

This step corresponds to step 512 in FIG. 5.

In some embodiments, in case of ATCF 501 with media anchored in the ATGW, the MSC Server 203 sends an Access Transfer Preparation Request, e.g. a SIP re-INVITE or PRACK message, to the ATCF 501 to trigger the ATCF/ATGW to have the media path switched to the IP address/port of the user equipment 101 on the target access.

In case there is no media anchored in the ATGW, the MSC Server 203 sends an Access Transfer Preparation Request to the ATCF 501 and the media path between ATCF/ATGW and the MSC Server/MGW is to be established.

Step 613

This step corresponds to step 310 in FIG. 3 and step 513 in FIG. 5.

The user equipment 101 sends a Handover confirmation to the eNB 103.

Step 614

This step corresponds to step 311 in FIG. 3 and step 514 in FIG. 5

The eNB 103 sends a Handover Notify to the MME 201

Step 615

The MME 201 sends a Forward relocation Complete message to the old SGSN 205. The term old SGSN and source SGSN refers to the same node.

Step 616

This step corresponds to step 312 in FIG. 3 and step 515 in FIG. 5.

The MME 201 sends a Modify Bearer Request to the SGW 207 to update PS bearer contexts first. The SGW 207 forwards the Modify Bearer Request to the PGW 207.

Step 617

This step corresponds to step 516 in FIG. 5.

The VoIP call may be sent in the default bearer.

Step 618

This step corresponds to step 517 in FIG. 5.

The PDN GW 207 informs the PCRF 212 about the change of, for example, the RAT type.

Step 606b

This step corresponds to steps 316, 317, 318, 319 and 320 in FIG. 3, and to step 506b in FIG. 5.

In some embodiments, the PCRF 212 continues the halted voice bearer allocation. The PCRF 212 builds the corresponding PCC rule and sends it to the PGW 207.

The PGW 207 sends a Create Bearer Request to create bearer contexts for voice/video to the SGW 207 and then forwarded to the MME 201.

The MME 201 requests the user equipment 101 to setup Voice bearer by sending an ACTIVATE DEDICATED EPS BEARER CONTEXT REQUEST message. Note that the corresponding E-RABs may have been established from the eNB 103 previously in step 306 and step 509.

The user equipment 101 accepts the bearer establishment by replying with ACTIVATE DEDICATED EPS BEARER CONTEXT ACCEPT message.

The MME 201 sends a Create Bearer Response to the SGW/PGW 207.

Step 619

This step corresponds to step 518 in FIG. 5.

Voice service is now handover to the PS 100b in LTE, and the VoIP call may be sent in the dedicated bearer.

Figure 7:
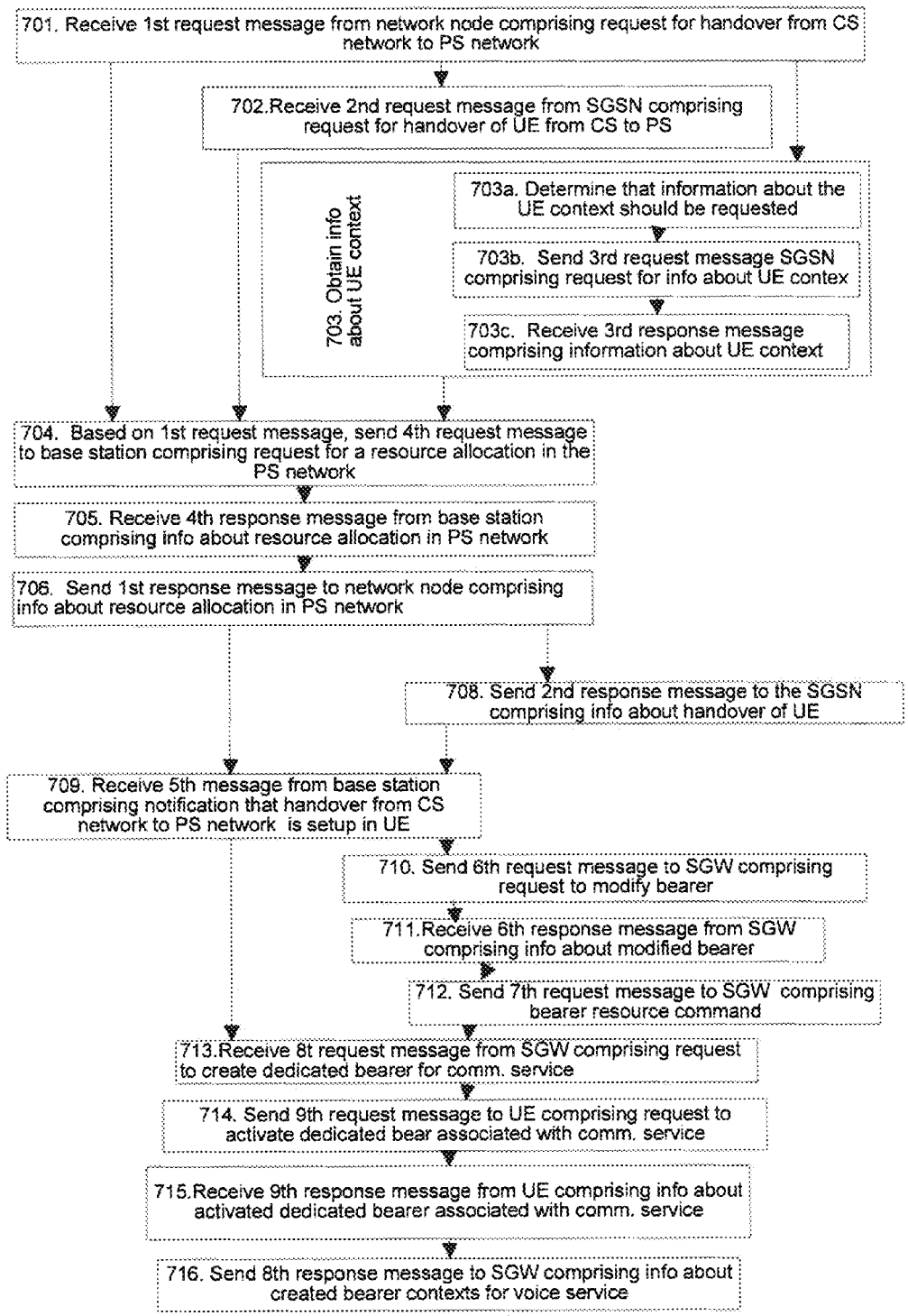
FIG. 7 is a flow chart illustrating embodiments of a method in a MME.

The method described above will now be described seen from the perspective of mobility management entity, referred to as MME 201. FIG. 7 is a flowchart describing a method in the MME 201, for enabling handover of a communication service between a circuit switched, referred to as CS, network 100a and a packet switched, referred to as PS, network 100b has a communications service in the CS network 100a.

The method comprises the steps to be performed by the MME 201:

Step 701

Figure 6:
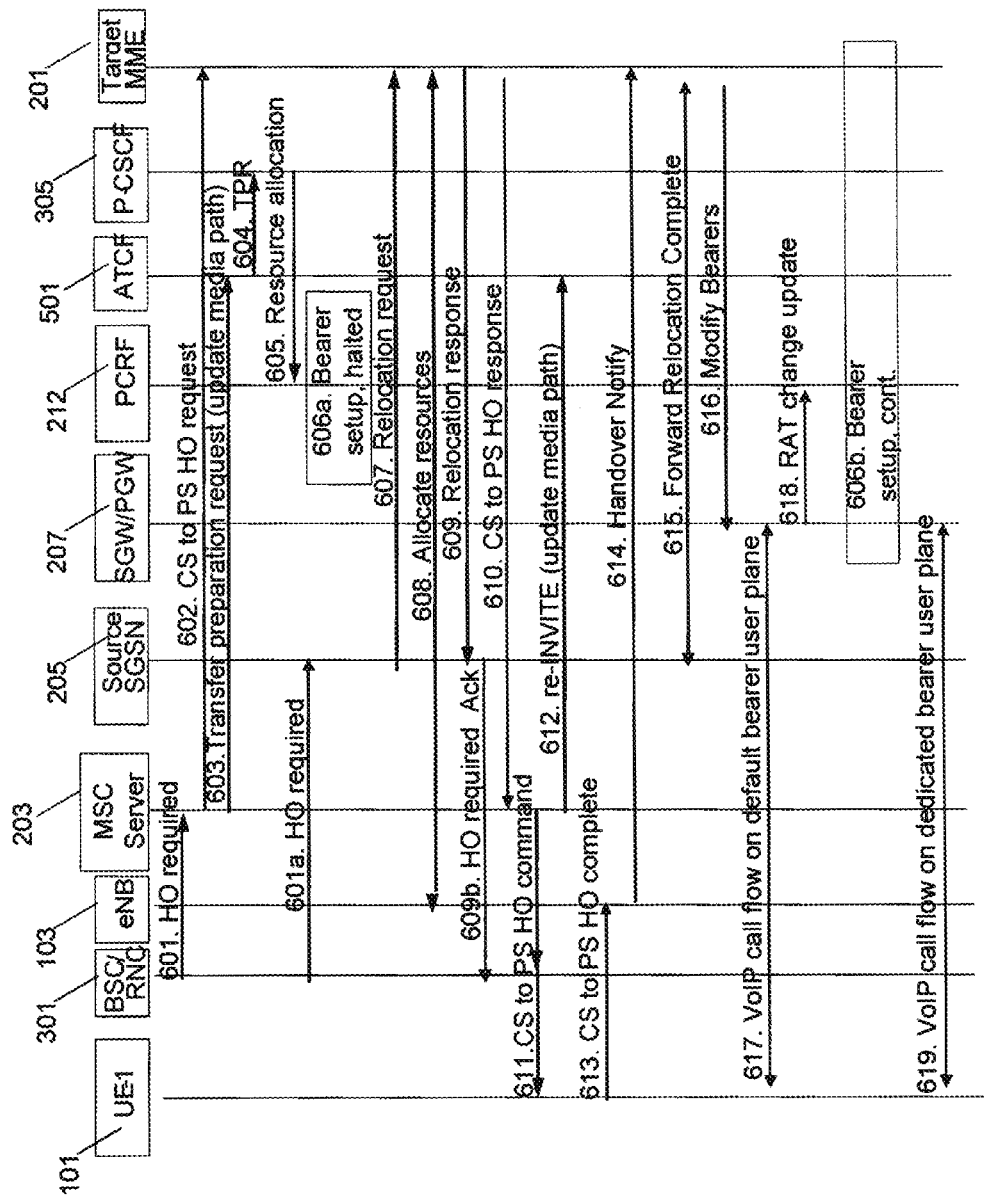
FIG. 6 is a combined flow chart and signalling diagram illustrating embodiments of a method for mobility from DTM to LTE/HSPA.

This step corresponds to step 302 in FIG. 3, step 403 in FIG. 4, step 502 in FIG. 5 and step 602 in FIG. 6.

The MME 201 receives a first request message from a network node. The first request message comprises a request for handover of the user equipment 101 from the CS network 100a to the PS network 100b indicating that an allocation of a resource associated with the communications service in the PS network 100b is needed. The handover from the CS network 100a to the PS network 100b may be a handover from 2G/3G to LTE.

In some embodiments, the first request message further comprises information about a Reverse Single Radio Voice Call Continuity request, referred to as rSRVCC.

In some embodiments, the network node is a mobile service switching centre, referred to as MSC, server 203, or a serving general packet radio service support node, referred to as SGSN 205.

Step 702

This step corresponds to step 404 in FIG. 4 and step 607 in FIG. 6.

In some embodiments, the MME 201 receives a second request message from the SGSN 205. The second request message comprises a request for handover of the user equipment 101 from the CS network 100a to the PS network 100b.

In some embodiments, the second request message from the SGSN 205 is based on the enabled DTM or the second request message from the SGSN 205 is received before expiry of a timer.

Step 703

This step corresponds to steps 303 and 304 in FIG. 3 and steps 507 and 508 in FIG. 5.

In some embodiments, the MME 201 obtains information about a user equipment context based on information comprised in the first request message.

Step 703a

This is a substep of step 703. Step 703a corresponds to step 303 in FIG. 3 and step 507 in FIG. 5.

In some embodiments, the first request message from the network node (203) further comprises an indication that a dual transfer mode, referred to as DTM, is disabled in the user equipment 101.

In some embodiments, the MME 201 determines that information about the user equipment context should be requested.

Step 703*b*

In some embodiments, the first request message from the network node 203 further comprises an indication that a dual transfer mode, referred to as DTM, is enabled in the user equipment 101.

This is a substep of step 703 and a step to be performed after step 703*a*. Step 703*b* corresponds to step 303 in FIG. 3 and step 507 in FIG. 5.

In some embodiments, the MME 201 sends a third request message to a serving general packet radio service support node, referred to as SGSN 205. The third request message comprises a request for information about the user equipment context.

Step 703*c*

In some embodiments, the first request message from the network node 203 further comprises an indication that a dual transfer mode, referred to as DTM, is enabled in the user equipment 101.

This is a substep of step 703, and a step to be preformed after step 703*b*. Step 703*c* corresponds to step 304 in FIG. 3 and step 505 in FIG. 5.

In some embodiments, the MME 201 receives a third response message. The third response message is a response to the third request message. The third response message comprises information about the user equipment context.

Step 704

This step corresponds to step 305 in FIG. 3, step 405 in FIG. 4, step 509 in FIG. 5 and 608 in FIG. 6.

Based on the first request message, the MME sends a fourth request message to a base station 103. The fourth request message comprises a request for the resource allocation in the PS network 100*b*.

Step 705

This step corresponds to step 306 in FIG. 3, step 406 in FIG. 4, step 509 in FIG. 5 and step 609 in FIG. 6.

The MME 201 receives a fourth response message from the base station 103. The fourth response message is a response to the fourth request message. The fourth response message comprises information about the allocation of the resources in the PS network 100*b*. The fourth response message is a local response from the eNB 103 indicating that preparation of bearers is done.

Step 706

This step corresponds to step 307 in FIG. 3, step 407 in FIG. 4, step 510 in FIG. 5 and step 610 in FIG. 6.

The MME 201 sends a first response message to the network node 203. The first response message is a response to the first request message. The first response message comprises information about the allocation of the resources in the PS network 100*b*.

Step 708

This step corresponds to step 408 in FIG. 4 and step 609 in FIG. 6.

In some embodiments, the MME 201 sends a second response message to the SGSN 205. The second response message is a response to the second request message. The second response message comprises information about the handover of the user equipment 101.

Step 709

This step corresponds to step 311 in FIG. 3, step 413 in FIG. 4, step 514 in FIG. 5 and step 614 in FIG. 6.

The MME 201 receives a fifth message from the base station 103. The fifth message comprises a notification that the handover from the CS network 100*a* to the PS network 100*b* is setup in the user equipment 101.

The fifth message is received after the user equipment 101 has re-tuned itself to the new cell and attached itself to the new base station, i.e. the eNB 103.

Step 710

This step corresponds to step 312 in FIG. 3, step 515 in FIG. 5 and step 616 in FIG. 6.

In some embodiments, the MME 201, based on the fifth message, sends a sixth request message to a serving gateway, referred to as SGW 207. The sixth request message comprises a request to modify the resources associated with the communications service.

Step 711

This step corresponds to step 313 in FIG. 3, step 515 in FIG. 5 and step 616 in FIG. 6.

In some embodiments, the MME 201 receives a sixth response message from the SGW 207. The sixth response message is a response to the sixth request message. The sixth response message comprises information about the modified resources associated with the communications service.

Step 712

This step corresponds to step 314 in FIG. 3, step 418 and 419 in FIG. 4.

In some embodiments, the MME 201 sends a seventh request message to the SGW 207. The seventh request message comprises a bearer resource command associated with the communications service.

Step 713

This step corresponds to step 317 in FIG. 3, step 422 in FIG. 4, step 506*b* in FIG. 5 and step 606*b* in FIG. 6.

The MME 201 receives an eight request message from the SGW 207. The eight request message comprises a request to create a dedicated bearer associated with the communication service in the PS network 100*b*.

Step 714

This step corresponds to step 318 in FIG. 3, step 423 in FIG. 4, step 506*b* in FIG. 5 and step 606*b* in FIG. 6.

The MME 201 sends a ninth request message to the user equipment 101. The ninth request message comprises a request to activate a dedicated bearer associated with the communications service.

Step 715

This step corresponds to step 319 in FIG. 3, step 424 in FIG. 4, step 506*b* in FIG. 5 and step 606*b* in FIG. 6.

The MME 201 receives a ninth response message from the user equipment 101. The ninth response message is a response to the ninth request message. The ninth response message comprises information about the activated dedicated bearer associated with the communications service.

Step 716

This step corresponds to step 320 in FIG. 3, step 425 in FIG. 4, step 506*b* in FIG. 5 and step 606*b* in FIG. 6.

The MME 201 sends an eight response message to the SGW 207. The eight response message is a response to the eight request message. The eight response message comprises information about the created dedicated bearer associated with the communications service, enabling handover of the communications service between the CS network 100*a* and the PS network 100*b*.

Figure 8:
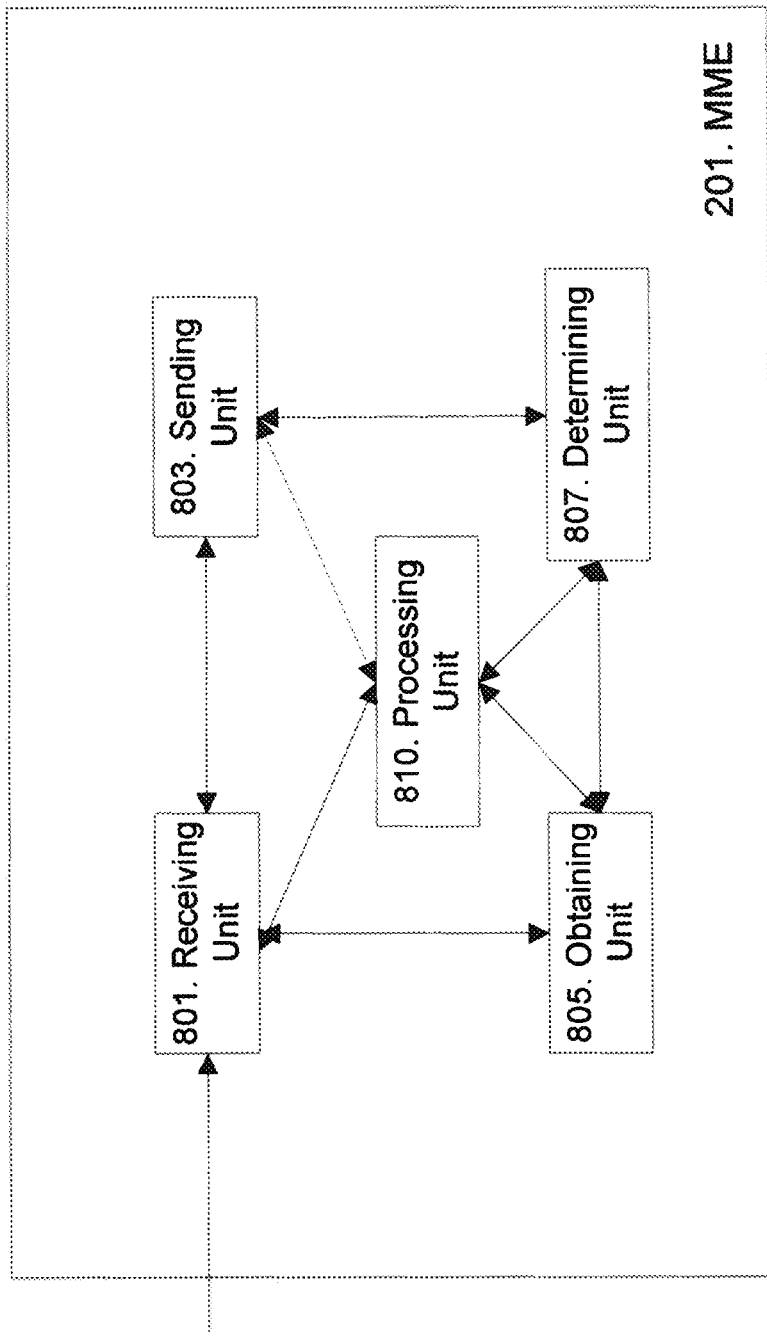
FIG. 8 is a schematic block diagram illustrating embodiments of a MME.

To perform the method steps shown in FIG. 7 for enabling handover of a communication service between a circuit switched, referred to as CS, network 100*a* and a packet switched, referred to as PS, network 100*b*, the MME 201 comprises an arrangement as shown in FIG. 8. A user equipment 101 is located in the CS network 100*a* and has a communications service in the CS network 100*a*.

The MME 201 comprises a receiving unit 801 configured to receive a first request message from a network node. In some embodiments, the network node 203 is a mobile service switching centre, referred to as MSC, server 203, or a serving general packet radio service support node, referred to as SGSN 205. The first request message comprises a request for handover of the user equipment 101 from the CS network 100a to the PS network 100b indicating that an allocation of a resource associated with the communications service in the PS network 100b is needed. In some embodiments, the receiving unit 801 is further configured to receive a fourth response message from the base station 103. The fourth response message is a response to the fourth request message. The fourth response message comprises information about the allocation of the resources in the PS network 100b. The receiving unit 801 is further configured to receive a fifth message from the base station 103. The fifth message comprises a notification that the handover from the CS network 100a to the PS network 100b is setup in the user equipment 101. The receiving unit 801 is further configured to receive an eight request message from the SGW 207. The eight request message comprises a request to create a dedicated bearer associated with the communication service in the PS network 100b. The receiving unit 801 is further configured to receive a ninth response message from the user equipment 101. The ninth response message is a response to the ninth request message. The ninth response message comprises information about the activated dedicated bearer associated with the communications service.

In some embodiments, the receiving unit 801 is further configured to receive a second request message from the SGSN 205. The second request message comprises a request for handover of the user equipment 101 from the CS network 100a to the PS network 100b.

In some embodiments, the first request message from the network node further comprises an indication that a dual transfer mode, referred to as DTM, is enabled in the user equipment 101.

In some embodiments, the first request message from the network node further comprises an indication that a dual transfer mode, referred to as DTM, is disabled in the user equipment 101.

In some embodiments, the receiving unit 801 is further configured to receive the second request message from the SGSN 205 is based on the enabled DTM or wherein the second request message from the SGSN 205 is received before expiry of a timer.

In some embodiments, the receiving unit 801 is further configured to receive a third response message. The third response message is a response to the third request message. The third response message comprises information about the user equipment context.

In some embodiments, wherein the receiving unit 801 is further configured to receive a sixth response message from the SGW 207. The sixth response message is a response to the sixth request message. The sixth response message comprises information about the modified dedicated bearer associated with the communications service.

In some embodiments, the first request message further comprises information about a Reverse Single Radio Voice Call Continuity request, referred to as rSRVCC.

The MME 201 comprises a sending unit 803 configured to, based on the first request message, send a fourth request message to a base station 103. The fourth request message comprises a request for the resource allocation in the PS network 100b. The sending unit 803 is further configured to send a first response message to the network node. The first response message is a response to the first request message. The first response message comprises information about the allocation of the resources in the PS network 100b. The sending unit 803 is further configured to send a ninth request message to the user equipment 101. The ninth request message comprises a request to activate a dedicated bearer associated with the communications service. The sending unit 803 is further configured to send an eight response message to the SGW 207. The eight response message is a response to the eight request message. The eight response message comprises information about the created dedicated bearer associated with the communications service, enabling handover of the communications service between the CS network 100a and the PS network 100b.

In some embodiments, the sending unit 803 is further configured to send a seventh request message to the SGW 207. The seventh request message comprises a bearer resource command associated with the communications service.

In some embodiments, the sending unit 803 is further configured to send a second response message to the SGSN 205. The second response message is a response to the second request message. The second response message comprises information about the handover of the user equipment 101.

In some embodiments, the sending unit 803 is further configured to send a third request message to a serving general packet radio service support node, referred to as SGSN 205. The third request message comprising a request for information about the user equipment context.

In some embodiments, the sending unit 803 is further configured to, based on the fifth message, send a sixth request message to a serving gateway, referred to as SGW 207. The sixth request message comprises a request to modify the dedicated bearer associated with the communications service.

In some embodiments, the MME 201 further comprises an obtaining unit 805 configured to obtain information about a user equipment context based on information comprised in the first request message.

In some embodiments, the MME 201 further comprises a determining unit 807 configured to determine that information about the user equipment context should be requested.

The present mechanism for enabling handover of a communication service between a circuit switched, referred to as CS, network 100a and a packet switched, referred to as PS, network 100b may be implemented through one or more processors, such as a processing unit 810 in the MME arrangement depicted in FIG. 8, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the MME 201. One such carrier may be in the form of a CD ROM disc. It is however feasible with other data carriers such as a memory stick. The computer program code may furthermore be provided as pure program code on a server and downloaded to the MME 201 remotely.

The embodiments herein are not limited to the above described preferred embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method in a mobility management entity (MME) for enabling handover of a communications service of a user equipment (UE) between a circuit switched (CS) network and a packet switched (PS) network, the UE being located in the CS network and having a communications service in the CS network, the method comprising:
receiving, by the MME, a handover request message from a mobile service switching center (MSC) server, for handover of the UE from the CS network to the PS network indicating that an allocation of a resource associated with the communications service in the PS network is needed;
sending, by the MME, a resource allocation request message to a base station, in the PS network;
receiving, by the MME, from the base station a resource allocation response message comprising information about the allocation of the resources in the PS network;
sending, by the MME, to the MSC server a handover response message, comprising information about the allocation of the resources in the PS network;
receiving, by the MME, from the base station a handover notification message comprising a notification that the handover from the CS network to the PS network is set up in the UE;
receiving, by the MME, from a serving gateway (SGW) a create dedicated bearer request message, comprising a request to create a dedicated bearer associated with the communications service in the PS network;
sending the MME, to the UE an activate dedicated bearer request message comprising a request to activate a dedicated bearer associated with the communications service;
receiving, by the MME, from the UE an activate dedicated bearer response message comprising information about the activated dedicated bearer associated with the communications service; and
sending, by the MME, to the SGW a create bearer response message comprising information about the created dedicated bearer associated with the communications service, enabling handover of the communications service between the CS network and the PS network.

2. The method according to claim 1, further comprising sending to the SGW a bearer resource command request message comprising a bearer resource command associated with the communications service.

3. The method according to claim 1, further comprising:
obtaining information about a UE context, based on information comprised in the handover request message or information available in the MME or both.

4. The method according to claim 1, further comprising:
receiving from a serving general packet radio service support node (SGSN), a relocation request message comprising a request for relocation of the UE from the CS network to the PS network; and
sending to the SGSN a relocation response message, which is a response to the relocation request message sent to the SGSN, and which relocation response message comprises information about the relocation of the UE.

5. The method according to claim 3, wherein the obtaining information about the UE context further comprises:
sending to a serving general packet radio service support node(SGSN) a context information request message comprising a request for information about the UE context; and
receiving a context information response message comprising information about the UE context.

6. The method according to claim 5, further comprising:
determining that information about the UE context should be requested.

7. The method according to claim 1, further comprising:
sending, by the MME, to the SGW a modify resources request message comprising a request to modify the resources associated with the communications service; and
receiving from the SGW a modify resources response message comprising information about the modified resources associated with the communications service.

8. The method according to claim 1, wherein the handover request message from the MSC server further comprises information about a Reverse Single Radio Voice Call Continuity request (rSRVCC).

9. A mobile management entity (MME) for enabling handover of a communication service between a circuit switched (CS) network and a packet switched (PS) network, wherein a user equipment (UE) is located in the CS network and has a communications service in the CS network, the MME comprising:
a receiving unit configured to receive a handover request message from a mobile service switching center (MSC) server for handover of the UE from the CS network to the PS network indicating that an allocation of a resource associated with the communications service in the PS network is needed; and
a sending unit configured to, based on the handover request message, send a resource allocation request message to a base station in the PS network, wherein
the receiving unit is further configured to receive from the base station a resource allocation response message comprising information about the allocation of the resources in the PS network;
the sending unit is further configured to send to the MSC server a handover response message, comprising information about the allocation of the resources in the PS network;
the receiving unit is further configured to receive from the base station a handover notification message comprising a notification that the handover from the CS network to the PS network is set up in the UE;
the receiving unit is further configured to receive from a serving gateway (SGW) a create dedicated bearer request message, comprising a request to create a dedicated bearer associated with the communication service in the PS network;
the sending unit is further configured to send to the UE an activate dedicated bearer request message comprising a request to activate a dedicated bearer associated with the communications service;
the receiving unit is further configured to receive from the UE an activate dedicated bearer response message comprising information about the activated dedicated bearer associated with the communications service; and the sending unit is further configured to send to the SGW a create dedicated bearer response message comprising information about the created dedicated bearer associated with the communications service, enabling handover of the communications service between the CS network and the PS network.

10. The MME according to claim 9, wherein the sending unit is further configured to send a bearer resource command request message comprising a bearer resource command associated with the communications service.

11. The MME according to claim 9, further comprising:
an obtaining unit configured to obtain information about a UE context based on information comprised in the handover request message.

12. The MME according to claim 9, wherein
the receiving unit is further configured to receive from a serving general packet radio service support node (SGSN) a relocation request message comprising a request for relocation of the UE from the CS network to the PS network; and
wherein the sending unit is further configured to send a relocation response message, which is a response to the relocation request message sent to the SGSN, and which relocation response message comprises information about the relocation of the UE.

13. The MME according to claim 9, wherein the sending unit is further configured to send a to a serving general packet radio service support node (SGSN) a context information request message comprising a request for information about the UE context; and
wherein the receiving unit is further configured to receive a context information response message comprising information about the UE context.

14. The MME according to claim 13, wherein the MME further comprises:
a determining unit configured to determine that information about the UE context should be requested.

15. The MME according to claim 9, wherein
the sending unit is further configured to send to the SGW a modify resources request message comprising a request to modify the resources associated with the communications service; and
wherein the receiving unit is further configured to receive a modify resources response message comprising information about the modified resources associated with the communications service.

16. The MME according to claim 9, wherein the handover request message further comprises information about a Reverse Single Radio Voice Call Continuity request (rSRVCC).

17. A mobile management entity(MME) for enabling handover of a communication service between a circuit switched (CS) network and a packet switched (PS) network, wherein a user equipment (UE) is located in the CS network and has a communications service in the CS network, the MME being configured to:
send a resource allocation request message to a base station in the PS network in response to receipt of a handover request message from a mobile service switching center (MSC) server for handover of the UE from the CS network to the PS network indicating that an allocation of a resource associated with the communications service in the PS network is needed;
send to the MSC server a handover response message after receiving from the base station a resource allocation response message comprising information about the allocation of the resources in the PS network, the handover response message comprising information about the allocation of the resources in the PS network;
send to the UE an activate dedicated bearer request message after receiving from the base station a handover notification message comprising a notification that the handover from the CS network to the PS network is setup in the UE and after receiving from a serving gateway (SGW) a create dedicated bearer request message, comprising a request to create a dedicated bearer associated with the communication service in the PS network, the activate dedicated bearer request message comprising a request to activate a dedicated bearer associated with the communications service; and
send to the SGW a create dedicated bearer response message after receiving from the UE an activate dedicated bearer response message comprising information about the activated dedicated bearer associated with the communications service, the create dedicated bearer response message comprising information about the created dedicated bearer associated with the communications service, enabling handover of the communications service between the CS network and the PS network.

18. The method of claim 1, wherein the MME is triggered to perform a handover of the UE from the CS network to the PS network by receiving a handover request message from the MSC server.

19. The MME of claim 9, wherein the MME is configured to be triggered to perform a handover of the UE from the CS network to the PS network by receiving a handover request message from the MSC server.

20. The MME of claim 17, wherein the MME is configured to be triggered to perform a handover of the UE from the CS network to the PS network by receiving a handover request message from the MSC server.

* * * * *

UNITED STATES PATENT AND TRADEMARK OFFICE
CERTIFICATE OF CORRECTION

PATENT NO. : 8,929,336 B2  
APPLICATION NO. : 13/537973  
DATED : January 6, 2015  
INVENTOR(S) : Rydnell et al.

Page 1 of 1

It is certified that error appears in the above-identified patent and that said Letters Patent is hereby corrected as shown below:

In the Specification

In Column 10, Line 36, delete "Fig.3," and insert -- Fig.3. --, therefor.

In the Claims

In Column 23, Line 42, in Claim 1, delete "sending" and insert -- sending, by --, therefor.

Signed and Sealed this
Twenty-ninth Day of September, 2015

Michelle K. Lee
*Director of the United States Patent and Trademark Office*